106-90
1/5/82    AU 113    EX
          XR    4,309,325

United States Patent [19]
Laquerbe et al.

[11] 4,309,325
[45] Jan. 5, 1982

[54] CLAY-CEMENT MORTARS AND TO THE PRODUCT MADE WITH SAID MORTARS

[75] Inventors: Michel Laquerbe; Francois Tatard, both of Rennes, France

[73] Assignee: Societe Metallurgique de Bretagne, France

[21] Appl. No.: 87,330

[22] Filed: Oct. 23, 1979

Related U.S. Application Data

[63] Continuation-in-part of Ser. No. 813,965, Jul. 18, 1977, abandoned, and Ser. No. 58,922, Jul. 19, 1979.

[30] Foreign Application Priority Data

Jul. 13, 1976 [FR] France ............................ 76 21522
Jul. 21, 1978 [FR] France ............................ 78 21747

[51] Int. Cl.$^3$ .................. C08L 61/20; C08L 61/28; C04B 7/02; C04B 31/30
[52] U.S. Cl. .................. 260/29.4 R; 260/29.4 UA; 260/29.6 PS; 106/76; 106/90; 106/94
[58] Field of Search ......... 260/29.4, 29.4 R, 29.4 UA, 260/29.6 PS; 106/76, 90, 94

[56] References Cited

U.S. PATENT DOCUMENTS

| | | | |
|---|---|---|---|
| 2,990,382 | 6/1961 | Wagner et al. | 106/93 |
| 3,663,287 | 5/1972 | Mizunuma et al. | 106/93 |
| 3,788,869 | 1/1974 | Batdorf et al. | 106/93 |
| 3,824,107 | 7/1974 | Weiant | 106/93 |
| 3,847,632 | 11/1974 | Blengsli | 106/97 |
| 4,046,583 | 9/1977 | Collepardi | 106/90 |
| 4,128,258 | 8/1980 | Rothberg | 260/17 R |
| 4,172,056 | 10/1979 | Marra | 260/17.2 |

FOREIGN PATENT DOCUMENTS

| | | |
|---|---|---|
| 943090 | 3/1961 | United Kingdom . |
| 998159 | 7/1965 | United Kingdom ............. 264/122 |

OTHER PUBLICATIONS

Chem. Absts., vol. 74:115421h, "Colored Mortar-Concrete-Melamine Resins", Aignesberger et al.
Belgian-856,767 Abstract-(Jan. 13, 1978), Soc. Metallurg Breta, "Clay Cement Mortar-Resins-Products.
Chem. Absts., vol. 85:98519d, "-Concrete-Mortars-with Improved Properties"-Institut Francais.
Chem. Abst., vol. 66:40515r, "Hydraulic Cement Mortar", Esso Research and Eng. Co.
Chem. Absts. vol. 83:120203d, "Cement Additive", Inoue.
Chem. Absts., vol. 81:67830m, Bleeding-Cement--Clays, Bruere.

*Primary Examiner*—John Kight, III
*Assistant Examiner*—N. M. Nutter

[57] ABSTRACT

The invention provides a clay/cement mortar which sets without cracking to a product having good mechanical properties, the mortar containing cement, clay in an amount by weight greater than that of the cement, gauging water, and an additive chosen from urea-formaldehyde and melamine-formaldehyde resins and derivatives of ammonia such as formamide, the dry weight of additive being between 1 and 20% of the total dry weight of the clay and cement. The clay is preferably basic or rendered so by addition of silicates or sodium aluminates, and absorbed water is preferably removed therefrom before mixing with the cement by adding a flocculant or water repellent. Adjuvants which may be incorporated in the mortar include paraffin, aluminium powder, glass and the like, and acrylic, A.B.S. and the like polymer emulsions. The mortar, after being formed to desired shape, is preferably kept for several hours in an atmosphere saturated with water vapor before being dried slowly to cause setting with curing of the additive.

17 Claims, No Drawings

CLAY-CEMENT MORTARS AND TO THE PRODUCT MADE WITH SAID MORTARS

RELATED APPLICATION

This is a Continuation-in-Part of Ser. No. 813,965, filed July 18, 1977, now abandoned and of Ser. No. 58,922 filed July 19, 1979, the contents of which are incorporated herein.

BACKGROUND OF THE INVENTION

The invention concerns a mortar based on clay and cement with a proportion by weight of clay greater than that of the cement, a mortar resulting in finished products which are at the same time inexpensive and of quality, in particular as regards their mechanical resistance and the substantial absence of cracking or shrinkage.

It also concerns methods of preparation and use of these mortars as well as the products made by means of the latter.

It will be recalled that it is already known for a mortar to be made by mixing or "gauging" clay, "gauging", water and certain mineral adjuvants such as sodium phosphates, sodium carbonate or calcium carbonate; these adjuvants exert in general a deflocculating or wetting effect, allowing the gauging water to dispense better in the mixture of clay and cement.

The inventors have discovered that such a deflocculating effect even if it perhaps facilitates the mixing itself, leads to mediocre characteristics of resistance and cohesion for the finished products after setting.

According to the invention, on the other hand, in addition to the gauging water, there is added to the clay-cement mixture a hydrophilic agent, capable of increasing the thixotropy of the mixture and crosslinking the product by polymerization during the subsequent setting, this agent being chosen from among urea-formaldehyde and melamine-formaldehyde resins and derivatives of ammonia such as formamide and being generally in solution in the gauging water, and this agent being used at a dry weight percentage between 1 and 20 based on the dry weight of the clay-cement mixture to which it is added.

It is also an object of the invention to improve the plasticity of the mortars concerned and to delay the setting thereof, which facilitates their application and in particular permits their injection into molds of small aperture such as pre-stressed sheaths.

In preferred embodiments use is made of one and/or other of the following features:

the proportion by weight of clay in the clay-cement mixture is between 1.5 and 4 times that of the cement, the clay used is basic [pH greater than 8] or rendered basic by the addition of silicates and/or of sodium aluminates, before mixing the clay with the cement, the quantity of absorbed water present in this clay is reduced by adding to it an additive, which is flocculant and/or capable of giving the clay water-repellent properties, in a proportion by dry weight of the order of 0.5 to 5 parts per thousand based on the dry weight of the clay, there is added, to one at least of the constituents of the mortar, aluminium powder in a proportion by dry weight of the order of 0.1 to 2 parts per thousand based on the dry weight of the said constituent, there is added, to the clay-cement mixture, a load of glass or the like in the form of fibres, powder or gel, there is added, to the clay-cement mixture, an acrylic of A.B.S. emulsion or the like, preferably diluted in water, at a dry solids weight percentage between 5 and 25% based on the dry weight of the clay-cement mixture, after use of the mortar according to the invention, the products made from this mortar are kept in an atmosphere saturated with water vapour for several hours before being slowly dried, The following features, used preferably in combination improve the plasticity of the mortars concerned and delay the setting thereof:

paraffin is added to one of the constituents of the mortar, preferably to the powdered cement, the weight of this paraffin being comprised between 0.3 and 5% of the weight of the cement, the paraffin which is solid at ordinary temperature is melted and dissolved in an organic solvent composed preferably half of a hydrocarbon (e.g., gasoline, petroleum or white spirit) and half of acetone, the amount by weight of the paraffin being of the order of ⅔ of this solution, the paraffin solution according to the preceding paragraph is mixed directly with the powdered cement, the paraffin solution according to the second preceding paragraph is mixed with water, in a substantially equivalent amount, with the amino-resin constituting the additive, the creamy liquid obtained constituting the liquid component whose addition to the powdery clay-cement mixture enables the mortar to be constituted, there is added to the above-defined mortar simultaneously but separately, sodium aluminate and sodium silicate in substantially identical proportions by weight, the amount by weight of these salts thus added to the mortar being comprised between 0.4 and 2% by weight of the dry components of the starting clay-cement powder.

The invention involves, apart from these principal features, certain other features which are preferably used at the same time and which will be more explicitly mentioned thereafter.

In what follows some preferred embodiments of the invention will be described in a non-limiting manner.

Clay being, by weight and volume, much less dear than cement, reduction of the cost of cements has long been sought by mixing the latter with clay.

But experience shows that products obtained from clay-cement-water mixtures exhibit, after setting, mediocre mechanical characteristics and tend to crack because of the shrinkage induced on setting by the removal of the gauging water.

To render the clay-cement-water mixtures more homogeneous, it has already been proposed to add to these mixtures special adjuvants tending to "deflocculate" or to "wet" the mixture, that is to say break up the agglomerates of the latter and to disperse the gauging water throughout the body of the said mixture in a more uniform way.

The inventors have discovered on the contrary that, by adding to the clay-cement-water mixture a hydrophilic and water retentive agent to increase the thixotropy of the mixture and to ensure a crosslinkage to this mixture by polymerization on setting, one could obtain finished products exhibiting, after setting, distinctly improved mechanical characteristics, with the absence of cracks.

Such an agent is chosen from among amino-resins, substances which possess adherent properties of the same kind as those of gum arabic and which are currently used for the gluing of plywoods or compressed woods.

Among these amino-resins, those preferred are the unreaformaldehyde or melamine-formaldehyde resins and derivatives of ammonia such as formamide in pulverised form or, more generally, in the form of an aqueous solution containing a minimum of 5% of water.

The minimum dry weight percentage of this agent used corresponds to 1 or 2% of the dry weight of the clay-cement mixture.

The maximum weight percentage of the said agent is of the order of 20%.

In particular if one supposes that the resin occurs in the form of a solution containing 50% of water, that all the gauging water comes from this solution, and that the proportion by weight of the cement in the clay-cement mixture is ¼, as the total contribution of water to the mixture must correspond at the maximum to 25% by weight of the cement, the maximum weight of dry resin is of the order of 15% of the dry weight of the clay-cement mixture.

The clay constituent of the mixture concerned can be pure clay or clayey soil more or less loaded with sand.

It is preferable for it to be basic, its pH being greater than 8; if this is not the case, it is advantageous to render it basic by the addition of sodium silicates or sodium aluminates.

In fact, these two salts used simultaneously, enable the plasticity of the clay-cement mixture, to which they are simultaneously added, to be improved, by changing the rheological state of this mixture to the point of rendering it almost thixotropic due to the fact of the chemical reactions that they cause which reactions are manifested by precipitation of silica and of gelantinous alumina as well as aluminum silicate, which material shows grains as scales or spindles. These reactions having a limited duration, it is advantageous to cause them in the course of the manufacture of the products by means of the mortar, just before the final shaping of the latter.

The cement constituent of the mixture is preferably rich in calcium aluminates.

The proportion by weight of dry clay to the dry cement is between 1.5 and 4, which means that the clay is the majority of the mixture.

With a mortar composed in that way, that is to say with cement, clay in a majority proportion, water and an amino-resin, one can make all the items currently made in cement, concrete and/or clay such as bricks, tiles, pottery, panels, slabs, plates corrugated or not, pipes, caissons etc., and in any suitable way, particularly by extrusion, drawing, moulding, injection, casting, application by trowel . . . , hot or even cold.

After fabrication, it is advisable to maintain the product obtained in a humid atmosphere for some hours, for example for 24 hours at 60° in an atmosphere saturated with water, and then to leave it to dry slowly.

The setting which results from this is accompanied by a polymerization with a slow progressive cross-linkage owing to the resins, in spite of the alkalinity of the medium; it is a surprising phenomenon, seeing that the said resins are considered to be capable of undergoing polymerization only in the presence of acid catalysts.

The products obtained after such a slow setting exhibit a cohesion and other mechanical properties which are very remarkable.

It is in this way, that these properties are comparable to those of similar known products in asbestos-cement which comprise 30% more of cement by volume and are consequently much heavier.

In a general way, it is usual for the dried coherent products according to the invention to exhibit mechanical resistance, to traction as much as to compression, of at least 30% greater than that of products made from clay-cement mortars of identical composition but in the absence of amino-resins.

The products in question have smooth exterior surfaces with a beautiful appearance keeping the colors of the initial constituents durably (especially red if pure clay predominates; white if the predominate constituent is kaolin, which is a clay rich in white mica).

In what follows there will be described a certain number of other features allowing still further improvement of the qualities of the above products.

According to one of these features, the clay is submitted, before its mixture with the cement, to a treatment which is "flocculant" and/or capable of conferring water repellent qualities on this clay, by adding to the latter an appropriate additive in small amounts (namely 0.5 to 5 parts by weight per thousand based on the dry weight of the clay) preferably by pulverisation of a solution of this additive in water during the premixing and pounding of the clay.

Such an additive is constituted for example:
by polyelectrolytes of the polyacrylamide type such as those distributed under the name MAGNAFLOC R 155 by the CAVIEM Company.
by quaternary ammonium salts such as those distributed under the name NORAMIUM M2SH by the PIERREFITTE-AUBY Company, especially if the clay used is loaded with crystals of high specific surface and lamellars in particular.
or by fatty amines such as those distributed under the name SIABIRAM 677 S by the PIERREFITTE-AUBY Company.

Paraffin also constitutes such a water-repellant agent, and its addition (preferably to the cement) permits the fluidity or plasticity of the paste to be substantially improved and the setting thereof to be delayed, which facilititates its application in numerous cases. The formula of the paraffin is $C_n H_{2n+2}$, with n being an integer from 17 to 60 inclusive. The melting temperature of a paraffin with $n=17$ is 22° C., and that of a paraffin with $n=60$ is 99° C.

The paraffin concerned—generally considered as a mixture of alkanes—is preferably selected from among those which are solid at ordinary temperature.

It is heated so as to melt it, that is to say to a temperature generally comprised between 50° and 100° C., and there is added thereto an organic solvent composed notably half by a hydrocarbon and half by acetone, the amount by weight of this solvent corresponding to a third of the total.

The solution obtained then preserves its liquid state on returning to ambient temperature.

In a first embodiment, powdered cement is added directly to this solution and the mixture is stirred at high speed to render it homogeneous.

The amount by weight of the paraffin thus added to the cement is comprised between 0.3 and 5% of that of the cement, preferably between 0.5 and 3% for a commercial Portland cement having a specific surface of 3,400 cm$^2$/g. If the percent of added paraffin is lower than 0.3, no water-repelling action is observable; if said percent is higher than 5, the water-repelling effect becomes undesirably irreversible.

It is the powdered mixture thus obtained which then constitutes the starting "cement component" in the method of manufacturing the mortar.

In a second embodiment, an equivalent amount of water and amino-resin is added directly to the above-paraffin solution, the amount of the amino-resin being determined so as to respond to the above-defined criteria, this amount being hence generally several times greater than that of the solution.

The "sauce" thus obtained can then be preserved as is, for later use to manufacture a mortar. It suffices to add the "sauce" to the minerals (clay and cement) and to the gauging water to constitute the mortar.

In a third embodiment, it is not the cement, but the clay or the clay-cement mixture, to which is added the paraffin solution with a proportion by weight preferably greater than 2% of the weight of the dry clay.

In all cases, in the slightly porous products finally obtained from mortars thus impregnanted with paraffins, the latter remains fixed on the walls of the pores or capillaries of said products and thus resists any entry of water subsequently into the latter.

This advantage is of particular value for the constitution of tiles or other products for weather protection as well as for products of the "expanded" type.

In order to accentuate as desired the basic character of the clay it is desirable, to add to the latter a sodium aluminate or a sodium silicate.

It is especially advantageous to provide the addition of sodium silicates and for sodium aluminates within the scope of the above-mentioned paraffin addition, in view of the fact that the first addition permits:

on the one hand, in a first stage, the delay applied to the setting of the cement by the presence of the water-repellant agent.

and on the other hand, in a second stage, to ensure said setting efficiently as soon as the soda derived from the second addition has been able to destroy the water-repellant film on the scale of each crystal and not of the pores or capillaries. That is to say, paraffin is absorbed on cement grains so as to isolate them from the water and other substances until it is detached from said grains by the excess of soda added with silicate and aluminate in the last stage of the process, such detached paraffin being then deposited in the pores and capillaries produced in the mass by evaporation of the liquids such as water and solvents.

The amount added to the mortar of the sodium aluminate (which is generally present in the form of a solution in the soda) and of the sodium silicate is respectively of comparable importance and the weight of each of them corresponds preferably to a percentage comprised between 0.2 and 1% of the weight of dry extracts of the clay-cement mixture.

According to yet another of the above features, aluminium in the form of powder is added to the clay or the cement.

The metal creates a gaseous expansion, which reduces the density of the final product obtained. Moreover, the aluminium salts formed by the reaction of the aluminium with the lime present in the cement ensure an excellent protection for the product against aging and against chemical attack by the air and by carbonic acid.

The proportion by weight of this addition of powder is advantageously between 0.1 and 2 parts per thousand based on dry weight of the clay-cement mixture to which the said powder is added.

Accordingly, to yet another of the features mentioned above, a acrylic, A.B.S or the like solution in water is added to the clay-cement mixture, the weight percentage of this addition generally being between 5 and 25% of the weight of the cement. Such additives do not include polyvinyl acetate or components with epoxy or sulfonic acid group-containing constituents.

This allows the products obtained to be rendered particularly waterproof and resistant to abrasion by giving their surfaces a glazed, smooth and dense appearance.

To improve the mechanical resistance of the products obtained, it is advantageous, according to yet another of the above features, to reinforce the mortar used by means of elements with a glass base, the elements being in the form of powder, gel (silica) or preferably in the form of fibres; the glass is, as a matter of fact, dissolved superficially by the alkaline material with which it is closely mixed, then is regenerated at the time of drying, forming a solid phase which is closely bound to the crystals of clay and cement.

There are thus provided mortars for the economical making of products which, after setting, exhibit excellent mechanical resistance and a tendency to cracking which is negligible, indeed non-existent.

These products can be identified, not only by their excellent mechanical properties but also by chemical analysis which reveals in particular the presence of marcomolecules of resin and traces of flocculant which are incorporated therein.

Cellulose and cellulose deivatives may be incorporated in the formulations of this invention, but such incorporation does not form any part of this invention.

As is evident, and as already results moreover from what procedes, the invention is not limited at all to those of its modes of application and realization which have been more especially envisaged; it embraces, on the contrary all the variants thereof.

What is claimed is:

1. A mortar consisting of a cement, clay in a proportion by weight which is between 1.5 and 4 times that of the cement, gauging water, and an additive selected from the group consisting of urea-formaldehyde resins, melamine-formaldehyde resins and formamide, the dry weight of additive present being between 1 and 20% of the total weight of the clay and cement, and said clay having a pH which is basic.

2. A mortar as claimed in claim 1 wherein the clay is selected from the group consisting of basic clays and clays rendered basic by the presence of at least one of member selected from the group consisting of sodium silicates and sodium aluminates.

3. A mortar consisting of a cement, clay in a proportion by weight which is between 1.5 and 4 times that of the cement, aluminum powder, gauging water, and an additive selected from the group consisting of ureaformaldehyde resins, melamine-formaldehyde resins and formamide, the dry weight of additive present being between 1 and 20% of the total weight of the clay and cement, and said clay having a pH which is basic.

4. A mortar consisting of a cement, clay in a proportion by weight which is between 1.5 and 4 times that of the cement, gauging water, an additive selected from the group consisting of ureaformaldehyde resins, melamine-formaldehyde resins and formamide, the dry weight of additive present being between 1 and 20% of the total weight of the clay and cement and an emulsion of polymer selected from the group consisting of acrylic and A.B.S. polymers the dry weight of said polymer being between 5 and 25% of the total dry weight of the clay and cement, and said clay having a pH which is basic.

5. A method of preparing a mortar as defined in claim 1 which comprises mixing a cement, polymer selected from the group consisting of acrylic and A.B.S polymers, the dry weight of said polymer being between 5 and 25% of the total dry weight of the clay and cement.

6. A process of making a set artifact which includes the steps of preparing a mortar by the method defined in claim 5, forming said mortar to a desired shape, maintaining said shaped mortar in a humid atmosphere at an elevated temperature, and thereafter slowly drying said shaped mortar whereby said mortar sets and the additive cures.

7. A process as claimed in claim 6, wherein said atmosphere is saturated with water vapor.

8. A set clay/cement artifact made by a process according to claim 6.

9. An artifact comprising the shaped and set product of a mortar as claimed in claim 1.

10. In a shaped set clay/cement product, containing clay in a proportion by weight which is between 1.5 and 4 times that of the cement the improvement which comprises a reinforcement dispersed through said product, said reinforcement comprising cured resin selected from the group consisting of cured urea-formaldehyde and melamine formaldehyde resins.

11. A mortar consisting of a cement, clay in a proportion by weight which is between 1.5 and 4 times that of the cement, gauging water, an additive selected from the group consisting of urea-formaldehyde resins, melamine-formaldehyde resins and formamide, the dry weight of additive present being between 1 and 20% of the total weight of the clay and cement, and, as a further additive, a paraffin in an amount of between 0.3 and 5% of the weight of the cement, and said clay having a pH which is basic, said mortar containing no polyvinyl acetate or components with epoxy sulfonic acid group containing constituents.

12. A method of preparing a mortar which comprises mixing a cement, clay in a proportion by weight which is between 1.5 and 4 times that of the cement, gauging water, and an additive selected from the group consisting of urea-formaldehyde resins, melamine-formaldehyde resins and formamide, the dry weight of additive present being between 1 and 20% of the total weight of the clay and cement, and said clay having a pH which is basic, adding, with mixing, simultaneously, but separately, sodium aluminate and sodium silicate in substantially identical proportions by weight, the amount by weight of each of these salts being between 0.2 and 1% of the weight of the dry clay-cement mixture to the mixture of the other components of the mortar just prior to the final shaping thereof.

13. The method of claim 12 wherein said paraffin, solid at ordinary temperatures, is melted and then dissolved in a solvent comprised half of a hydrocarbon and half of acetone.

14. A process of making a set artifact which includes the steps of preparing a mortar by the method defined in claim 12, forming said mortar to a desired shape, maintaining said shaped mortar in a humid atmosphere, at an elevated temperature and thereafter slowly drying said shaped mortar whereby said mortar sets and the additive cures.

15. An artifact comprising the shaped and set product of a mortar as claimed in claim 11.

16. A mortar consisting of a cement, clay in a proportion by weight which is between 1.5 and 4 times that of the cement, gauging water, and an additive which is a urea-formaldehyde resin, the dry weight of additive present being between 1 and 20% of the total weight of the clay and cement, and said clay having a pH which is basic.

17. A mortar consisting of a cement, clay in a proportion by weight which is between 1.5 and 4 times that of the cement, gauging water, and an additive which is a formamide, the dry weight of additive present being between 1 and 20% of the total weight of the clay and cement, and said clay having a pH which is basic.

* * * * *